Patented May 4, 1948

2,440,699

UNITED STATES PATENT OFFICE 2,440,699

PROCESS OF MAKING FOOD PRODUCT

C. Lynn Peterson, Salt Lake City, Utah

No Drawing. Application July 26, 1945,
Serial No. 607,254

7 Claims. (Cl. 99—2)

This invention relates to a process of making an improved food product and more particularly a food product containing ingredients which are beneficial in decreasing or eliminating gastric disturbances in the digestive tract.

One of the objects of my invention is to produce an improved food product having embodied therein and finely dispersed throughout the mass of the product an ingredient in the form of charred organic material which is beneficial in decreasing or eliminating gastric disturbances in the digestive tract.

Another and more specific object is to produce a food product which has charcoal finely dispersed throughout its mass.

Still another object is to produce a new process of finely dispersing throughout the mass of a food substance an ingredient which is beneficial to the digestive tract of the consumer.

A further object is to embody in a food product by a filtration process an ingredient beneficial to the digestive tract.

Yet another object is to so filter from a solution a food substance that there will be added to the filtered food substance a finely dispersed charcoal.

Other objects of my invention will become apparent from the following description of my new food product and the process by which it is made, including, by way of example, reference to specific ingredients of a particular food product.

My improved food product comprises a mash having food values in which is dispersed a finely divided ingredient beneficial in the digestion of the product, particularly in the decreasing or elimination of gastric disturbances resulting from gases formed during digestion, such ingredient being a charred organic material such as, for example, charcoal, bleached bone char and the like. I am aware that food products for animals, a class for which my improved food product is especially suited, have as a contained ingredient pulverized charcoal but this charcoal has merely been added into the food substance by stirring and agitating with a suitable mixer when the food substance is in bulk. Consequently there is not a thorough dispersing of the charcoal with the result that the consumer may separate out as much of the charcoal as possible and thus not obtain the full benefits. Furthermore, without a complete dispersion of the charcoal throughout the food product a uniform benefit also does not result.

The new food product may embody as the food substance grain pulp, fruit and vegetable pulp and pulp from any rind products. This food substance generally results from processes employed to extract certain ingredients from original material as, for example, oil from soybeans, sugar from sugar beets, juices from fruits and vegetables, etc. As a result of extraction processes the food substance forming the food value material of my new product is in solution and when filtering it out of such solution to form a mash the ingredient, such as charcoal or bleached bone char, is embodied therein.

The preferred method employed is to coat a filter medium such as canvas, cocoa matting, etc., with the ingredient to be mixed into the food substance. The type of filter to be used can be either the leaf type or drum type. A preferred type of filter is the Syncro-drum Continu-coat filter disclosed by the application of C. Lynn Peterson et al., Ser. No. 440,858, filed April 28, 1942, now Patent Number 2,403,021, issued July 2, 1946, for "Method and apparatus for filtration" or the Continu-coat drum filter with pressure roll as also disclosed in the same application. After the cost of the ingredient to be added is placed on the filter medium the solution containing the food substance forming the food material of the new food product is filtered through the filter medium. Due to the fact that the coat of the ingredient is wet and also the food material is wet and is being drawn into the coat of the ingredient, there will be an interspersing of the two which is further assisted by the wetness of the materials. Suction is used during the filtering and thus the food material will be pulled into the coat of the ingredient. After a cake is formed on the filter medium it is scraped off by a suitable scraper and to assist this scraper in removing the cake, air is blown through the filter medium in an outward direction. The action of the scraper and the air current together will product additional mixing and dispersing of the ingredient in the food substance. The final result will be a food which will have embodied therein and finely dispersed therethrough the desired added ingredient to aid in digestion by being beneficial in decreasing or eliminating troublesome gastric disturbances. The percentage of the ingredient dispersed in the product can be varied by varying the amount coated on the filter medium.

A specific example of the food product and the method of making same, which embodies my invention, would be one in which finely divided charcoal is dispersed in a soy bean flake mash.

The soy bean flakes, after the extraction of oil from the soy bean meal or pulp, would be suspended in a neutral water solution and these flakes would amount to approximately 3% of the solution. A slurry of pulverized wood charcoal would first be deposited as a coat on the filter medium and if the filter is of the Syncro-drum type in order to carry out a continuous process the charcoal would be deposited by suction on the moving filter medium, such as a cocoa mat. The percentage of charcoal desired in the resulting food product would determine the percentage of charcoal suspended in the slurry. After this charcoal is coated onto the filter medium the solution containing the suspended soy bean flakes is passed through the filter medium with the aid of suction. This will cause the soy bean flakes to become dispersed into the charcoal particles and vice versa, and since both the flakes and the charcoal are wet there will result additional interspersing. The cake formed on the filter medium may be washed with water, if desired, further interspersing the soy bean flakes and charcoal. The cake is next scraped off of the filter medium by a suitable scraper and to aid in the removal of the cake air under pressure is forced through the filter medium toward the cake side. Scraping off of the cake, together with the air pressure, will result in a certain amount of agitation and mixing of the resulting product, thus bringing about an additional dispersion of the charcoal in the soy bean flakes.

The result will be a mash forming my improved food product. If the food product is intended for cattle feed it should contain about five to six percent of charcoal and if it is intended for chick feed it should contain approximately four percent, this percentage being controlled, as previously noted, by the amount of charcoal deposited on the filter medium. The dispersion of the charcoal in the soy bean flakes is considerably greater than any dispersion that can be obtained by merely taking the mesh resulting from filtering the soy bean solution and adding the charcoal and mixing it by some mechanical mixer. The product from my improved process will not contain any large chunks or lumps of charcoal. The charcoal will be so finely dispersed in the product that the animal consuming it cannot separate portions of the charcoal and avoid taking it with the soy bean flakes. Because it is finely dispersed through the soy bean flakes it will have a very uniform and continuous effect in the digestive tract of the animal to prevent or eliminate gastric disturbances. By having finely divided charcoal intermixed with all the soy bean flakes there will always be charcoal present in the digestive tract during digestion of the flakes to absorb any gases which might be present. Such would not be the case if there were clumps of charcoal in the food as part of the charcoal would be ineffective to absorb any gases. Furthermore, with clumps of charcoal there would be a tendency for these to become coated over during the digestive process any they would be ineffective for the purposes for which they are added to the food.

What is being claimed is:

1. A method of producing a food product comprising a mash having food values and through which is finely dispersed a charred organic material as an ingredient beneficial in decreasing gastric disturbance in the digestive tract, said method of including the step of embodying the ingredient in the food product by filtering the mash from a solution and by means of a filter medium which has a thin coat of the ingredient thereon and into which the mash is deposited.

2. A method of producing a food product comprising a mash having food values and through which charcoal is finely dispersed, said method including the step of embodying the charcoal in the food product by filtering the mash from a solution and by means of a filter medium which has a thin coat of fine charcoal thereon and into which the mash is deposited.

3. A method of producing a food product comprising soy bean flakes through which charcoal is finely dispersed, said method including the step of filtering a solution containing the flakes through a filter medium which has a thin coat of charcoal thereon and into which the flakes are deposited.

4. The improved method of embodying finely divided charcoal in a mash having food values which comprises passing a solution containing the substance having the food values through a filter medium having a coat of the charcoal thereon to thus produce a thin cake of the substance and the charcoal on the filter medium and then removing the cake from the filter medium.

5. The improved method of embodying finely divided charcoal in soy bean flakes which comprises passing a solution containing the flakes through a filter medium having a coat of the charcoal thereon to thus produce a thin cake of the flakes and charcoal on the filter medium and then removing the cake from the filter medium.

6. The improved method of embodying finely divided charred organic material in a food substance which comprises placing a wet thin coat of the charred material on a filter medium, interspersing particles of the food substance and the charred material by filtering a solution containing the food substance through the charred material and the filter medium and then removing the interspersed food substance and charred material from the filter medium and simultaneously agitating the mixture.

7. A method of producing an animal feed in the form of a mash including a food containing substance having interspersed therewith a finely divided gas absorbing charred organic ingredient, said method including the step of mixing said food containing substance and said charred organic ingredient by depositing particles of one onto particles of the other while in a wet state.

C. LYNN PETERSON.

REFERENCES CITED

The following references are of record in the file of this patent:

UNITED STATES PATENTS

| Number | Name | Date |
|---|---|---|
| Re. 18,719 | Eicher | Jan. 24, 1933 |
| 1,637,428 | Rupp | Aug. 2, 1927 |
| 2,246,770 | Wessel | June 24, 1941 |